(12) United States Patent
Shinosaka

(10) Patent No.: US 8,816,549 B2
(45) Date of Patent: Aug. 26, 2014

(54) VEHICLE AC GENERATOR

(75) Inventor: Yoshihiro Shinosaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 385 days.

(21) Appl. No.: 12/968,974

(22) Filed: Dec. 15, 2010

(65) Prior Publication Data

US 2012/0025657 A1    Feb. 2, 2012

(30) Foreign Application Priority Data

Jul. 28, 2010    (JP) ................... 2010-169226

(51) Int. Cl.
*H02K 5/22* (2006.01)

(52) U.S. Cl.
USPC .............................. 310/71; 310/89

(58) Field of Classification Search
USPC .................. 310/67 D, 68 D, 71
See application file for complete search history.

(56) References Cited

U.S. PATENT DOCUMENTS

| 7,400,073 | B2 * | 7/2008 | Yanagisawa et al. | 310/71 |
| 7,456,532 | B2 * | 11/2008 | Oohashi | 310/68 D |
| 7,554,233 | B2 * | 6/2009 | Itou | 310/71 |
| 2006/0258540 | A1 | 11/2006 | Yanagisawa et al. | |
| 2006/0273671 | A1 | 12/2006 | Oohashi | |
| 2008/0136568 | A1 | 6/2008 | Miyake | |

FOREIGN PATENT DOCUMENTS

| JP | 05-022891 A | 1/1993 |
| JP | 5-225874 A | 9/1993 |
| JP | 6-335192 A | 12/1994 |
| JP | 3379457 B2 | 12/2002 |
| JP | 2006-320066 A | 11/2006 |
| JP | 2006-340516 A | 12/2006 |
| JP | 2008-146871 A | 6/2008 |
| JP | 2008-206379 A | 9/2008 |

OTHER PUBLICATIONS

Japanese Office Action corresponding to Japanese Patent Application No. 2010-169226, dated May 15, 2012.

* cited by examiner

*Primary Examiner* — Burton Mullins
(74) *Attorney, Agent, or Firm* — Sughrue Mion, PLLC

(57) ABSTRACT

In order to provide a vehicle AC generator capable of easily setting an attachment direction of a battery terminal and reducing the total shaft length of the generator, in the vehicle AC generator including a case composed of a front bracket and a rear bracket, and a rotor and a stator which are arranged in the case, the vehicle AC generator includes a battery terminal arranged on an outer circumferential portion of the rear bracket, an engaging body provided on the battery terminal, and a plurality of fitting portions to which the engaging body is fitted.

15 Claims, 3 Drawing Sheets

US 8,816,549 B2

VEHICLE AC GENERATOR

BACKGROUND OF THE INVENTION

1. Field of the Invention

The present invention relates to a vehicle AC (alternating current) generator mounted on a vehicle and, more particularly, relates to an attachment structure of a battery terminal for power output.

2. Description of the Related Art

Hitherto, a battery terminal for power output has been attached to a vehicle AC generator at the back of the generator. There are largely two types of generator structures. First, one type is such that components such as a rectifier and a voltage regulator (hereinafter, referred to as a "regulator") are arranged inside a bracket serving as a housing. The other type is such that those components are arranged outside the bracket and are protected by a resin-made cover.

In the former case, the battery terminal is attached to a rear bracket; in the latter case, the battery terminal is attached to the cover. Then, an attachment direction of the battery terminal is determined by the shape of the rear bracket in the former case; in the latter case, the attachment direction is determined by the shape of a heat sink of the rectifier or the cover.

There are two attachment ways in the configuration of the battery terminal according to the aforementioned known device. One way is that the battery terminal is provided with a space for the battery terminal on the rear bracket or the cover and is attached in such a way as to be fitted there; the other way is that the battery terminal is attached in such a way as to be arranged on a surface of the rear bracket or the cover.

In the former case, the attachment direction of the battery terminal is determined by the shape of a fitting portion of the rear bracket or the cover, or by the shape of a flange for battery terminal attachment of the heat sink of the rectifier. In the latter case, the attachment direction of the battery terminal is determined by a direction of a fitting portion provided on the surface of the bracket or the cover.

However, there are various requests that the angle of the battery terminal is required to be in an upward direction or in a downward direction for each car maker or vehicle depending on an attachment position of the generator, a harness mounting method, or the like at customer requirements or the like. In order to meet the requirements, in the case of changing the attachment direction of the battery terminal, in the former case, the bracket, the cover, the heat sink, or the battery terminal having a special shape needs to be newly set. Each of these components is a formed component by a die and, in the case of new set, unnecessary costs are incurred. Furthermore, variations of components increase and therefore various disadvantages such as degradation in productivity are incurred.

In addition, in the latter case, if fitting portions for determining the attachment direction of the battery terminal are provided in plural number on the surface of the bracket or the cover, the angle of the battery terminal can be changed. However, the battery terminal is located on the surface of the cover or the bracket; therefore, there is a demerit in that the battery terminal largely protrudes from the backward side of the generator and the total shaft length of the generator increases.

SUMMARY OF THE INVENTION

The present invention has been made to solve the problem described above, and an object of the present invention is to provide a vehicle AC generator which can easily set an attachment direction of a battery terminal and can reduce the total shaft length of the generator.

According to the present invention, there is provided a vehicle AC generator including a case composed of a front bracket and a rear bracket, and a rotor and a stator which are arranged in the case. The vehicle AC generator includes: a battery terminal arranged on an outer circumferential portion of the rear bracket; an engaging body provided on the battery terminal; and a plurality of fitting portions to which the engaging body is fitted.

According to the vehicle AC generator of the present invention, the vehicle AC generator in which an attachment direction of the battery terminal can be easily set and the total shaft length of the generator can be reduced.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
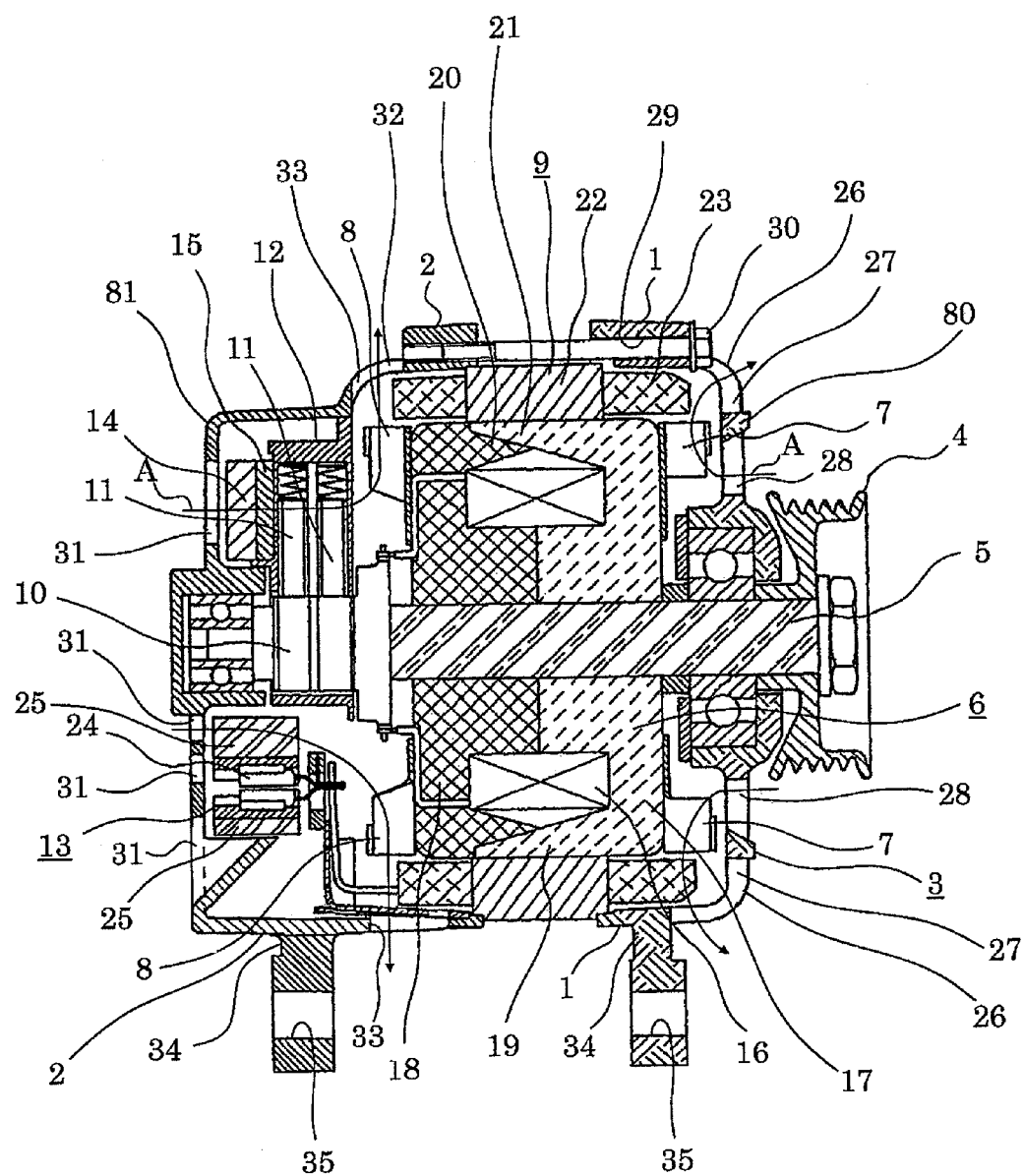
FIG. 1. is a sectional view showing a rear bracket type in a vehicle AC generator according to Embodiment 1 of the present invention.
Figure 2:
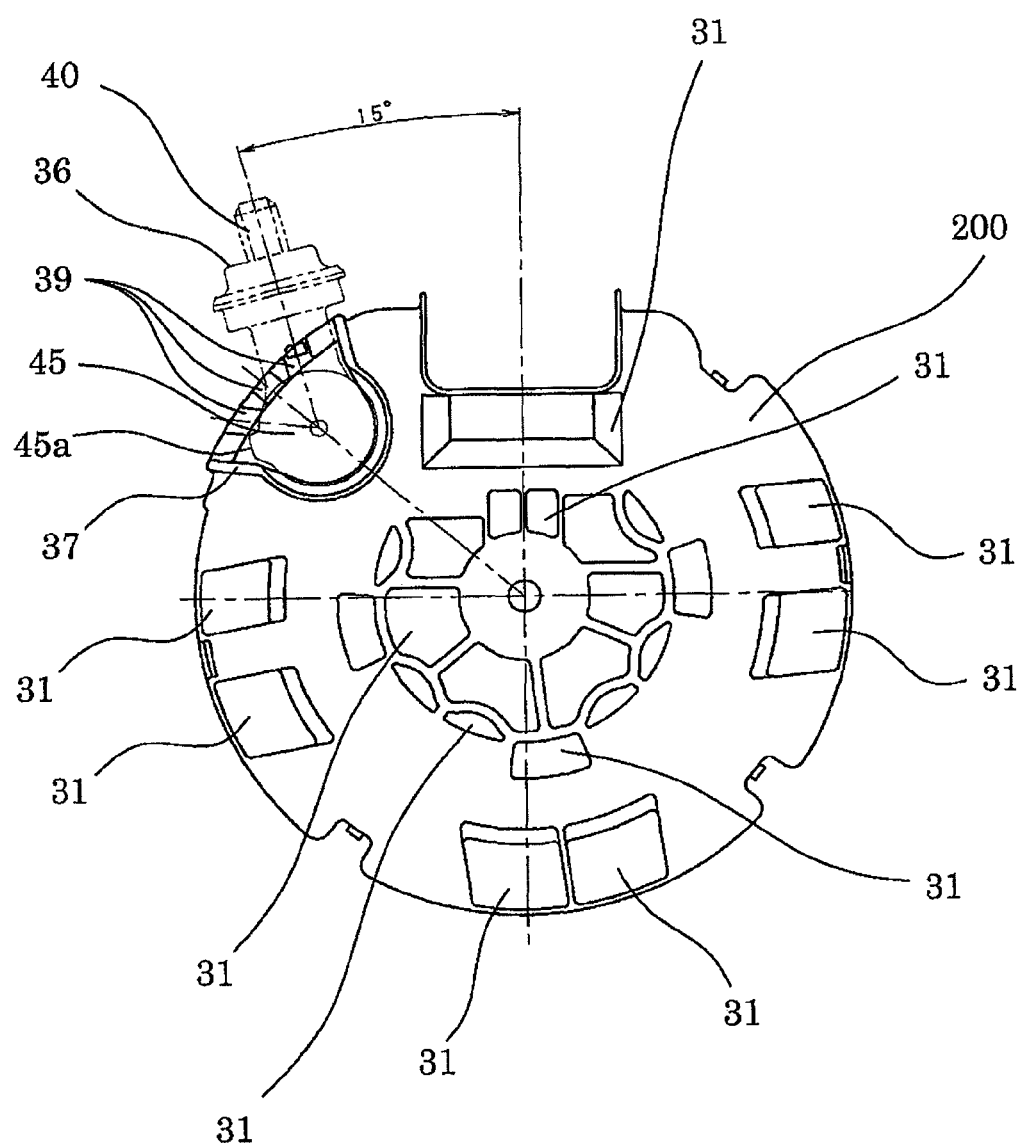
FIG. 2 is a front view showing a cover of a cover type in the vehicle AC generator according to Embodiment 1 of the present invention.
Figure 3:
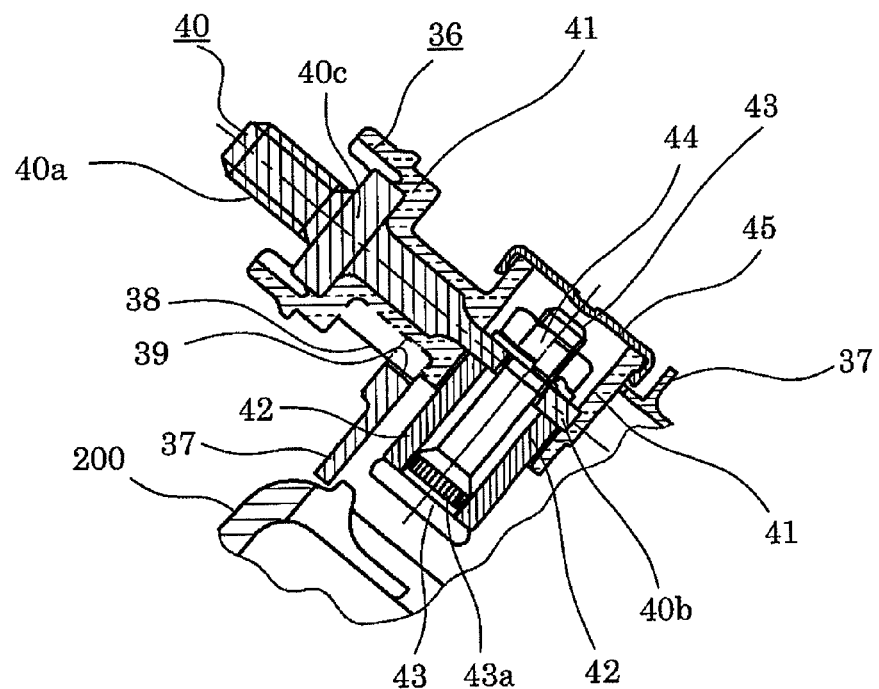
FIG. 3 is a sectional view showing a battery terminal portion in the vehicle AC generator according to Embodiment 1 of the present invention.
Figure 4:
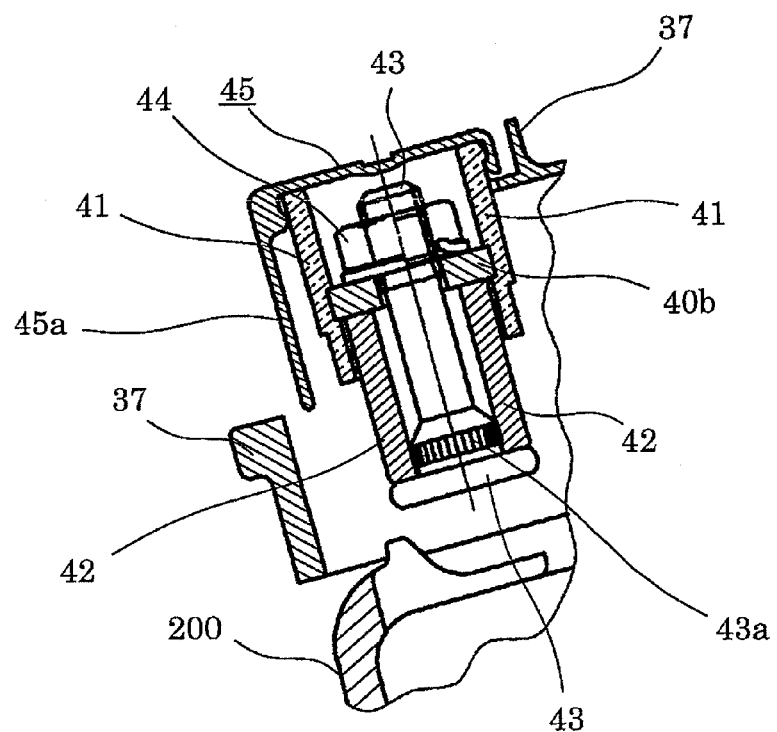
FIG. 4 is a sectional view showing the battery terminal portion in the vehicle AC generator according to Embodiment 1 of the present invention.

Hereinafter, Embodiment 1 of the present invention will be described with reference to FIG. 1 to FIG. 4; however, in each of the drawings, identical or equivalent members and portions will be described with the same reference numerals. FIG. 1 is a sectional view showing a rear bracket type in a vehicle AC generator according to Embodiment 1 of the present invention. FIG. 2 is a front view showing a cover of a cover type in the vehicle AC generator according to Embodiment 1 of the present invention. FIG. 3 is a sectional view showing a battery terminal portion in the vehicle AC generator according to Embodiment 1 of the present invention. FIG. 4 is a sectional view showing the battery terminal portion in the vehicle AC generator according to Embodiment 1 of the present invention.

The vehicle AC generator in Embodiment 1 includes a case 3 composed of a front bracket 1 and a rear bracket 2, both of which are made of aluminum; a shaft 5 provided in the case 3 and provided with a pulley 4 which is attached at one end portion of the shaft; a rotor 6 attached to the shaft 5; a front fan 7 attached on the front bracket 1 side of the rotor 6 and configured by a centrifugal fan, for example; a rear fan 8 attached on the rear bracket 2 side of the rotor 6 and configured by a centrifugal fan, for example; a stator 9 fixed to the front bracket 1 and the rear bracket 2 on an inner wall surface in the case 3; a slip ring 10 which is fixed to the other end portion of the shaft 5 and is for supplying current to the rotor 6; a pair of brushes 11 to be slid to the slip ring 10; a brush holder 12 in which the brushes 11 are placed; a rectifier 13 which is electrically connected to the stator 9 and rectifies alternating current (AC) generated by the stator 9 to direct current (DC); a heat sink 14 fitted to the brush holder 12; and a regulator 15 which is adhered to the heat sink 14 and regulates. AC voltage generated by the stator 9.

The rotor 7 includes a rotor coil 16 which is formed by being wound with a wire and generates magnetic flux by feeding current; and a pole core 17 which is provided covering the rotor coil 16 and in which a magnetic pole is formed by the magnetic flux. The pole core 17 is composed of a pair of a first pole core body 18 and a second pole core body 19 which are alternately engaged. The first pole core body 18 and the second pole core body 19 are made of iron and have claw shaped magnetic poles 20 and 21 having a claw shape, respectively. Adjacent respective claw shaped magnetic poles 20 and 21 are arranged so that the magnetic flux does not leak between both claw shaped magnetic poles and so that a certain gap between the magnetic poles is formed so as to be a cooling air path which is for cooling the rotor coil 16.

The stator 9 includes a stator core 22, and a stator coil 23 in which a wire is wound around a slot (not shown in the drawing) of the stator core 22 and AC is generated by a change in the magnetic flux of the rotor coil 16 with the rotation of the rotor 6. The stator coil 23 is configured by a three phase AC winding in which, for example, three winding portions (not shown in the drawing) are connected in three phase Y connection or three phase Δ connection.

The rectifier 13 includes a diode 24 which rectifies AC generated by the stator 9 to DC and a heat sink 25 which is for dissipating heat generated by the diode 24.

The front bracket 1 is provided with a plurality of exhaust openings 27 formed by a plurality of ribs 26 on an outer circumferential portion of a bracket body 80. A plurality of suction openings 28 are formed inside the exhaust opening 27. Furthermore, through holes 29 are formed at four positions that are spaced at an angle of 90° on the outer circumferential portion of the bracket body 80. A fastening bolt 30 is passed through the through hole 29 and is screwed to the rear bracket 2; and the stator core 22 is held in sandwiched relation between the rear bracket 2 and the front bracket 1.

In the rear bracket 2, a bracket body 81 is provided with a plurality of suction openings 31, and has a plurality of exhaust openings 33 formed by a plurality of ribs 32 on an outer circumferential portion on the front bracket 1 side of the bracket body 81.

In addition, the front bracket 1 and the rear bracket 2 are each provided with an attachment leg portion 34, and an attachment hole 35 is formed in each attachment leg portion 34. An attachment bolt (not shown in the drawing) is passed through the attachment hole 35 and is screwed to an engine body (not shown in the drawing); thus, the vehicle AC generator is fixed to the engine body.

By the way, FIG. 2 is the front view showing the cover of the cover type in the vehicle AC generator according to Embodiment 1 of the present invention. Reference numeral 36 denotes a battery terminal which is arranged so that an end portion thereof protrudes on an outer circumferential portion in a circumferential direction of a cover 200, and an attachment portion of the battery terminal 36 is arranged on the center direction side from an outer circumferential surface of the cover 200. 37 denotes a cover body provided on the attachment portion of the battery terminal 36, the cover body being a body integrally configured with the cover 200. 38 denotes an engaging body provided on the battery terminal 36. 39 denotes a plurality of fitting portions provided on the cover body 37, for example; and the engaging body 38 of the battery terminal 36 is fitted to these fitting portions 39 and thus an attachment angle of the battery terminal 36 is determined. Incidentally, a connector (not shown in the drawing) is arranged on an upper concave shaped space portion shown in FIG. 2. The figure shows a case where attachment is constructed at an angle of 15 degrees based on the position of the connector, as an example.

40 denotes an output terminal bolt that is a component which constitutes the battery terminal 36; and the output terminal bolt 40 has a terminal thread portion 40a, a flat portion 40b, and a flange portion 40c. 41 is a mold portion of the battery terminal 36.

42 denotes a + side (positive side) heat sink of the heat sink 25 of the rectifier 13. 43 and 44 denote a bolt and a nut, both of which attach the flat portion 40b of the output terminal bolt 40 that is the battery terminal 36 to the + side heat sink 42. 43a denotes a fitting portion of the bolt 43 which is fitted to the + side heat sink 42.

45 denotes a cap for the battery terminal provided over the bolt 43 and the nut 44 portion that is the attachment portion of the battery terminal 36, and a blocking piece 45a is provided.

In the above configured vehicle AC generator, current is supplied from a battery (not shown in the drawing) to the rotor coil 16 through the brush 11 and the slip ring 10 to generate the magnetic flux; for example, the claw shaped magnetic pole 20 of the first pole core body 18 is magnetized to an N pole, and the claw shaped magnetic pole 21 of the second pole core body 19 is magnetized to an S pole. On the other hand, the pulley 4 is driven by the engine and the rotor 6 is rotated by the shaft 5; therefore, a rotating magnetic field is given to the stator coil 23 and electromotive force is generated in the stator coil 23. This AC electromotive force is rectified to DC through the rectifier 13, and the size thereof is regulated by the regulator 15 and is charged to the battery. Incidentally, a polarity of the N pole or the S pole is determined by the direction of a field current which flows through the rotor coil 16 depending on an attachment way (connection way) of the slip ring 10.

The rotor coil 16 and the stator coil 23 constantly generates heat during power generation. On the other hand, in order to dissipate the heat generated by the power generation, the front fan 7 and the rear fan 8 rotate; as shown by arrows A in FIG. 1, cooling air is entered from the suction openings 28 and 31 to the front bracket 1 and the rear bracket 2, and is exhausted from the exhaust openings 27 and 33 to the outside.

In addition, in Embodiment 1, as shown in FIG. 2, the case where attachment is constructed at the angle of 15 degrees is shown. That is, for example, there is shown the case where the engaging body 38 of the battery terminal 36 is made to fit to the upper side fitting portion 39 among three provided fitting portions 39 and accordingly the battery terminal 36 is attached.

By the way, in the case where the attachment direction of the battery terminal 36 needs to be attached at an angle larger than 15 degrees at customer requirements or the like, the engaging body 38 of the battery terminal 36 is made to fit to the middle side or the lower side fitting portion 39 among three provided fitting portions 39 and accordingly the battery terminal 36 can be attached at a large angle. Therefore, Embodiment 1 is free from the following problems: as the aforementioned known device, the bracket, the cover, the heat sink, or the battery terminal having a special shape needs to be newly set; in the case of new set of formed components by these dies, unnecessary costs are incurred; furthermore, various disadvantages such as degradation in productivity due to an increase of variations of components are incurred. Consequently, economic efficiency is excellent and an improvement in productivity can be achieved.

As described above, according to Embodiment 1, the attachment portion of the battery terminal 36 is arranged on the outer circumferential surface of the cover 200 and on the inner direction side from the axial rear end surface of the cover 200; accordingly, the battery terminal 36 does not protrude on the axial side of the generator, and there can be obtained a vehicle AC generator in which the total shaft length of the generator can be reduced. In addition, the attachment portion of the battery terminal 36 is arranged on the axial center direction side from the outer circumferential surface of the cover 200; accordingly, the circumferential size of the generator can also be reduced.

By the way, the case where the attachment portion of the battery terminal 36 is arranged on the axial center direction side from the outer circumferential surface of the cover 200 is described; however, the attachment portion of the battery terminal 36 is not arranged on the axial center direction side, but is arranged on the outer circumferential surface of the cover 200; accordingly, an expected purpose that reduces the total shaft length of the generator can be achieved.

Furthermore, the cap for the battery terminal 45 is provided over the bolt 43 and the nut 44 portion for attaching the flat portion 40b of the output terminal bolt 40 that is the battery terminal 36 on the + side heat sink 42; accordingly, an improvement in safety is achieved. In addition, a space portion near the fitting portion 39, the space portion being generated depending on the attachment position of the battery terminal 36, is blocked by the blocking piece 45a which is provided on the cap for the battery terminal 45; accordingly, an improvement in safety is further achieved. Further, the blocking piece 45a is provided; accordingly, penetration of water, saline and muddy water, foreign particles, and the like to the inside is prevented and an improvement in durability can be achieved.

Moreover, in the above described Embodiment 1, the case where the plurality of fitting portions 39 are provided on the cover body 37 which is the body integrally configured with the cover 200 is described. However, the cover 200 and the cover body 37 may be configured by the rear bracket 2 and the plurality of fitting portions 39 may be provided on the rear bracket 2; accordingly, the same effects as the above described Embodiment 1 can be exhibited.

In addition, the case where the provided number of the plurality of fitting portions 39 is three is described; however, the number of the fitting portions 39 may be two, or four, or more than such numbers; and accordingly, the same effects as the above described Embodiment 1 can be exhibited.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A vehicle AC generator including a case composed of a front bracket and a rear bracket, and a rotor and a stator which are arranged in said case, said vehicle AC generator comprising:
    a battery terminal arranged on an outer circumferential portion of said rear bracket;
    an engaging body provided on said battery terminal; and
    a plurality of fitting portions of which said engaging body is fitted into only one of the plurality of fitting portions,
    wherein the engaging body has an outer circumference and the one of the plurality of fitting portions receives the outer circumference of the engaging body.

2. The vehicle AC generator according to claim 1, wherein the fitting portion is provided on said rear bracket or a cover body.

3. The vehicle AC generator according to claim 1, wherein an attachment portion of said battery terminal is arranged on an inner side from an outer circumferential surface of said rear bracket.

4. The vehicle AC generator according to claim 2, wherein an attachment portion of said battery terminal is arranged on an inner side from an outer circumferential surface of said rear bracket.

5. The vehicle AC generator according to claim 1, further comprising a cap for said battery terminal, said cap being attached over the attachment portion of said battery terminal.

6. The vehicle AC generator according to claim 2, further comprising a cap for said battery terminal, said cap being attached over the attachment portion of said battery terminal.

7. The vehicle AC generator according to claim 3, further comprising a cap for said battery terminal, said cap being attached over the attachment portion of said battery terminal.

8. The vehicle AC generator according to claim 4, further comprising a cap for said battery terminal, said cap being attached over the attachment portion of said battery terminal.

9. The vehicle AC generator according to claim 5, further comprising a blocking piece which is provided on said cap for said battery terminal.

10. The vehicle AC generator according to claim 6, further comprising a blocking piece which is provided on said cap for said battery terminal.

11. The vehicle AC generator according to claim 7, further comprising a blocking piece which is provided on said cap for said battery terminal.

12. The vehicle AC generator according to claim 8, further comprising a blocking piece which is provided on said cap for said battery terminal.

13. The vehicle AC generator according to claim 1, wherein an attachment angle of the battery terminal depends on which one of the plurality of fitting portions the said engaging body is fitted to.

14. The vehicle AC generator according to claim 13, wherein the plurality of fitting portions includes at least an upper side fitting portion, a middle side fitting portion, and a lower side fitting portion, and
    wherein the battery terminal has a larger attachment angle when fitted to one of the lower side fitting portion and the middle side fitting portion than when being fitted to the upper side fitting portion,
    wherein the attachment angle is measured between a radially extending line from a center of the battery terminal and a radially extending line from a center of the bracket.

15. The vehicle AC generator according to claim 14, wherein when the engaging body is fitted into the upper side fitting portion, the battery terminal has an attachment angle of fifteen degrees,
    wherein the attachment angle is an angle between the battery terminal and a center line of the bracket.

* * * * *